3,658,896
OLEFINIC HYDROCARBON OXIDATION PROCESS
Paul H. Washecheck, Ponca City, Okla., assignor to
Continental Oil Company, Ponca City, Okla.
No Drawing. Filed Nov. 12, 1969, Ser. No. 876,042
Int. Cl. C07c 51/32
U.S. Cl. 260—533 R 11 Claims

ABSTRACT OF THE DISCLOSURE

A process for the catalytic oxidation of an olefinic hydrocarbon is provided wherein the cleavage of the olefinic hydrocarbon occurs at a point of unsaturation. The catalytic system employed in said process consists essentially of a minor amount of a ruthenium-containing compound and a major amount of a peracid. The olefinic hydrocarbon and ruthenium-containing compound are admixed to produce a mixture having the ruthenium compound dispersed therein. The peracid is then added to the mixture of olefinic hydrocarbon and ruthenium compound to form a resultant mixture wherein an exothermic reaction transpires. The carboxylic acid components formed during the exothermic reaction are then recovered from the mixture.

BACKGROUND OF THE INVENTION

(A) Field of the invention

This invention relates to a novel catalytic system for the catalytic oxidation of olefinic hydrocarbons. In one aspect, this invention relates to a process employing a novel catalytic system consisting essentially of a minor amount of a ruthenium-containing compound and a major amount of a peracid. In another aspect, this invention relates to a process for the catalytic oxidation of an olefinic hydrocarbon in which cleavage of the olefinic hydrocarbon occurs at a point of unsaturation which comprises admixing the olefinic hydrocarbon with a ruthenium-containing compound to produce a mixture having the ruthenium-containing compound dispersed therein and adding to the resulting mixture a peracid.

(B) Brief description of the prior art

The reaction of olefinic hydrocarbons with peracids is well known and can be found in any standard text book on organic chemistry. The product of the reaction is normally the epoxide or another product derived directly from the epoxide. Such a reaction is illustrated by the following formula:

$$RCH=CH_2 + R'CO_3H \longrightarrow RCH\overset{O}{-}CH_2 + R'CO_2H$$

The epoxidation reaction occurs rapidly at room temperature or below. Very high yields of epoxide can be obtained in most cases. However, attempts to produce the carboxylic acid constituents of the olefinic hydrocarbon compounds by contacting same with peracids have up to this time met with little or no success.

Many other types of oxidation of olefinic compounds with metals and metallic ions, in aquated form or in coordination with non-metallic elements, often are employed to initiate commercially attractive organic reactions. However, these initiators are often quite expensive and, unlike true catalysts, they are usually consumed in the reaction. In addition, problems have been encountered in the formation of undesirable side reaction products when employing many of these prior art catalyst systems. Thus, new and effective processes for the catalytic oxidation of olefinic hydrocarbons to carboxylic acid compounds are constantly being sought, as well as are novel catalytic systems for use in such processes.

OBJECTS OF THE INVENTION

An object of the present invention is to provide a process for the oxidation of olefinic hydrocarbons to carboxylic acids.

Another object of the present invention is to provide a novel catalytic system for the catalytic oxidation of an olefinic hydrocarbon wherein cleavage of the olefinic hydrocarbon occurs at the carbon-to-carbon double bond.

Another object of the invention is to provide a processs for the catalytic oxidation of olefinic hydrocarbons in which side reactions are maintained at a minimum, thus allowing one to recover as the major product the corresponding carboxylic acid components.

These and other objects, advantages and features of the present invention will become apparent to those skilled in the art from a reading of the following detailed description and appended claims.

SUMMARY OF THE INVENTION

According to the present invention, I have now found that by adding a minor amount of a ruthenium-containing compound to an olefinic hydrocarbon compound so as to provide a reaction mixture having the ruthenium-containing compound thoroughly dispersed therein and then admixing a peracid with the reaction mixture an exothermic reaction occurs which produces the carboxylic acid components corresponding to said olefinic hydrocarbon compound.

Further, according to the present invention, I have discovered a process for the catalytic oxidation of an olefinic hydrocarbon in which cleavage of the olefinic hydrocarbon occurs at a point of unsaturation with a catalytic system consisting essentially of a minor amount of a ruthenium-containing compound and a major amount of a peracid.

DESCRIPTION OF THE PREFERRED EMBODIMENTS

The process of the present invention comprises a process for the catalytic oxidation of olefinic hydracarbons having from 2 to about 40 carbon atoms in which cleavage of the olefinic hydrocarbon occurs at a point of unsaturation with a catalytic system consisting essentially of a minor amount of a ruthenium-containing compound and a major amount of a peracid. The ruthenium-containing compound can be any suitable material, such as ruthenium metal, organic ruthenium compounds, and inorganic ruthenium compounds. Any organic and inorganic ruthenium salt having an anion which does not unduly retard the formation of the desired carboxylic acids by an undesirable side reaction can be employed as a suitable catalyst. Examples of suitable organic ruthenium salt compounds are salts of low molecular weight fatty acids such as ruthenium formates, ruthenium acetates, ruthenium propionate, and ruthenium butyrate.

As with the case of the organic salts mentioned above, any ruthenium-containing inorganic salt can be employed as the ruthenium-containing compound provided that the anion constituent does not unduly retard the formation of the desired carboxylic acid compound. Salts of this type are readily available and comparatively inexpensive. However, as with the case of the organic salts, the salt compound must contain ruthenium as the catalytic ingredient because other members of the Group VIII metals are not effective catalysts in the oxidation described in the present invention. Examples showing the ineffectiveness of other Group VIII metals will be discussed in detail with the examples which will follow hereinafter. Examples of suitable inorganic salt compounds which can be employed in the catalyst composition of the present invention are ruthenium trichloride, ruthenium tribromide, ruthenium sulfide, ruthenium carbonate, ruthenium dioxide, and the like. Especially desirable results have been obtained wherein the ruthenium-containing compound is ruthenium trichloride or ruthenium dioxide. Since the ruthenium metal or ruthenium compound are not soluble in the olefinic hydrocarbon, the ruthenium metal or ruthenium-containing compound is in a fine state of subdivision so that a dispersion of the material can readily be accomplished in the olefinic hydrocarbon.

The other important and necessary part of the catalytic system for the catalytic oxidation of an olefinic hydrocarbon of the present invention is the presence of a major amount of a peracid. While any suitable peracid can be employed as the peracid constituent of the catalytic system of the present invention, desirable results have been obtained wherein the peracid is selected from the group consisting of performic acid, trifluoroperacetic acid, peracetic acid, metachloroperbenzoic acid, perbenzoic acid and the like. Especially desirable results have been obtained wherein peracetic acid is employed as the peracid of the catalytic system of the present invention.

The amount of ruthenium-containing compound and the amount of the peracid employed in the catalytic system of the present invention can vary widely, the only criteria being that the reaction of the process is carried in the presence of a catalytic amount of the ruthenium-containing material and a major amount of peracid. Generally, the amount of ruthenium-containing compound present in the catalytic system is from about 0.00001 to 1.0 weight percent based on the weight of the olefinic hydrocarbon. The amount of peracid employed in the catalytic system is normally present in an amount from about 1 to $10^5$ weight percent based upon the weight of the olefinic hydrocarbon. Desirable results have been obtained where the ruthenium-containing compound is present in an amount of from about 0.0001 to 0.001 weight percent and the peracid is present in an amount of from about 50 to 1000 weight percent.

The process of this invention is generally carried out at atmospheric pressures and at the temperature produced by the exothermic reaction of the olefinic hydrocarbon-ruthenium containing compound mixture and the peracid. Care should be exercised in conducting the reaction because if one attempts to cool the reaction, experiments have shown that the reaction cannot be contained. While, as previously stated, the reaction is normally carried out under atmospheric pressure, the olefinic hydrocarbon compound is to be maintained in the liquid state. Thus, when olefinic hydrocarbons, such as olefins having up to 6 carbon atoms are employed, it may be desirable to carry out the reaction under pressure to maintain such olefins in liquid state. Any suitable pressure above atmospheric may be employed in such situations. The only criteria being that the pressure be sufficient to maintain the olefinic hydrocarbon in the liquid state at the temperature generated by the exothermic reaction.

In carrying out the process for the catalytic oxidation of an olefinic hydrocarbon in which the cleavage of the olefinic hydrocarbon occurs at a point of unsaturation, the olefinic hydrocarbon is admixed with a catalytic amount of a ruthenium-containing compound so as to produce a mixture having the ruthenium-containing compound dispersed therein. Generally, the olefinic hydrocarbon is present in an amount from about 1 to 99.99999 weight percent and the ruthenium compound is preesnt in an amount from about 0.00001 to 1.0 weight percent based on the weight of said olefinic hydrocarbon. However, desirable results have been obtained wherein the olefinic hydrocarbon is present in amount from about 10 to 80 weight percent and the ruthenium-containing compound is present in an amount of from about 0.00001 to 0.001 weight percent.

As is apparent, due to the minor catalytic amount of ruthenium-containing compound employed in the process of this invention, the ruthenium-compound normally will stay thoroughly dispersed within the olefinic hydrocarbon. Thus, agitation is not absolutely necessary in the process. However, it is often advantageous to employ agitation because efficient agitation usually tends to decrease the reaction time and facilitates the dissipation of the heat generated by the exothermic reaction.

The mixture of the olefinic hydrocarbon and the ruthenium-containing compound is then contacted with from about 1 to $10^5$ weight percent of a peracid. As previously stated, desirable results are obtained when about 50 to 1000 weight percent peracid is employed. The peracid is added to the olefinic hydrocarbon mixture containing the ruthenium-containing compound and the resultant mixture produces an exothermic reaction. The resultant mixture is then maintained for a period of time effective to allow substantial completion of the exothermic reaction. The carboxylic acid components formed during the exothermic reaction are then removed from the reaction mixture.

The process can be carried out in the presence of a non-aqueous solvent medium when desired, the only criteria being that the solvent medium be an inert solvent which is not susceptible to oxidation. The amount of solvent employed can vary over a wide percentage and as much as up to about 89 weight percent solvent medium, based on the total weight of the reaction mixture. Desirable results have been obtained wherein the solvent medium is present in an amount of 25 to 75 weight percent. As previously stated, the solvent can be any suitable inert solvent which is not susceptible to oxidation and which does not produce undesirable side reactions. In general, paraffinic hydrocarbons having from about 5 to 30 carbon atoms, halogenated hydrocarbons having up to about 4 carbon atoms and esters having from 2 to about 20 carbon atoms are employed as the solvent. However, paraffinic hydrocarbons are generally desired. Desirable results have been obtained wherein the solvent employed is selected from the group consisting of pentane, hexane, heptane, dichloromethane, ethyl acetate, trifluoroacetic acid, and the like.

The reaction times can vary widely and will depend primarily on the amount of olefinic hydrocarbon employed, the type of olefinic hydrocarbon, and the presence or absence of a solvent medium. The olefinic hydrocarbons employed in the practice of the present invention can be any suitable olefinic hydrocarbon having from 2 to about 40 carbon atoms, and can be aliphatic, cycloaliphatic, branched, cyclic, bicyclic and the like in configuration. Desirable results have been obtained when the olefinic hydrocarbon is an $\alpha$-olefin or an internal olefin having from 2 to about 20 carbon atoms. To further illustrate, examples of specific olefinic hydrocarcarbons having from 2 to about 40 carbon atoms which can be employed in the practice of the present invention are: ethylene; pentene-2; octadiene-1,5; dodecene-4; pentacosene-6; nonacose-3; hexatricontene-1; pentacontene-15; 3-methylhexane-1; 4-ethyloctene-2; cyclobutene; cyclohexene; cyclododecene; cyclotricontene; 1-ethyl-4-propylcyclooctene; 1-ethyl-3-butyl-5-pentylcyclododecene; styrene; 3-methyl-styrene; tetraphenylethylene; vinylnaphthalene; vinylanthracene; 4-butyl-1-vinylnaphthalene; 2,7-diphenyldodecene-3; 1-hexene; 1-octene; 1-decene; 1-dodecene; 1-tetradecene; internal isomers of decene; dodecene; tetradecene; hexadecene; octadecane; eicosene; vinylcyclohexene; 1,3-butadiene or alkyl substituted butadiene; and the like.

Thus, it is clearly evident that any olefinic hydrocarbon which contains from 2 to about 40 carbon atoms can be employed to produce their corresponding carboxylic acid components by the novel catalytic system and process of the present invention, the only requirement being that the olefinic hydrocarbon is stable under the reaction conditions and does not contain substituent groups which hinder or retard the process of the invention by undergoing competitive side reactions.

As previously stated, it is undesirable to attempt to lower the temperature of the exothermic reaction during the reaction. However, after the reaction has proceeded to the desired point and is substantially complete, one may desire to apply cooling to the reaction mixture at that time to facilitate the lowering of the temperature of the spent reaction mixture and thus allow recovery of the carboxylic acid components at a lower temperature. However, in operating the process of the present invention in a continuous manner one would not need to lower the temperature of the reaction mixture prior to separating the carboxylic acid components.

The carboxylic acid components can readily be separated from the reaction mixture by any suitable means which are well known in the art, such as by extraction with a base, distillation and the like.

When employing the base extraction, the reaction mixture is washed with water or brine to remove the peracid components and its decomposition products which may have formed during the exothermic reaction. The water phase is then separated from the organic phase of the reaction mixture and the organic phase is extracted with a suitable base, such as ammonium hydroxide, sodium hydroxide, potassium hydroxide, and the like. The carboxylic acid components are then in the base phase which is separated. The resulting base phase is then neutralized with any suitable mineral acid, such as hydrochloric acid, sulfuric acid, phosphoric acid, nitric acid, and the like, to free the carboxylic acid components. The carboxylic acid components can then be separated by extraction, decanting and the like.

It is evident from the above discussion that the process and catalytic system of the present invention are quite versatile and may be used for the preparation of a wide variety of carboxylic acid components and mixtures thereof by selecting particular olefinic hydrocarbons as the starting material. For example, the process may be employed to prepare a predetermined mixture of acids of varying chain lengths and/or a mixture of mono-and dicarboxylic acids merely by having a particular mixture of olefinic hydrocarbon compound as the starting material. The following examples are given to further illustrate the process and catalytic system of the present invention. However, it is to be understood that the following examples are for illustrative purposes only and are not intended to be limitations upon the invention contained here. All parts given in the examples are parts by weight unless otherwise indicated.

Example I

A series of experiments were conducted to illustrate the novel catalytic system and process of the present invention. In each experiment the olefinic hydrocarbon compound, the solvent medium, and the ruthenium-containing compound were introduced into a reaction vessel at room temperature. The olefinic hydrocarbon, the ruthenium-containing compound, and solvent medium were varied in the experiments and such are tabulated in Table 1 below.

The contents of the reaction vessel were then agitated to insure dispersion of the ruthenium-containing compound in the olefinic hydrocarbon. A 40-weight percent solution of peracetic acid was then added to the reaction vessel and an exothermic reaction ensured. The reaction mixture was allowed to warm to gentle reflux conditions. After the addition of the peracetic acid was completed, stirring was continued until the exothermic reaction had ceased and the resultant mixture had cooled to substantially room temperature.

Peracetic acid was selected as a typical peracid. It is a readily available commercial product. It has the advantage that both the peracid and normal carboxylic acid are water-soluble and thus are easily separated from the reaction products.

In order to separate the reaction products from the reaction mixture, the resultant two-phase mixture was separated and the aqueous acid phase was extracted with an additional portion of heptane to insure complete recovery of the products for analytical purposes. The combined paraffin fractions were then washed with water or brine to insure complete removal of acetic acid and excess peracetic acid. The washed paraffin phase was extracted with an aqueous solution of sodium hydroxide to transfer the carboxylic acids from the paraffin phase to the aqueous phase. The paraffin phase was determined to contain unreacted olefinic hydrocarbon which could be recycled to the reaction vessel. The carboxylic acids were then recovered from the aqueous phase by neutralizing with mineral acid such as hydrochloric acid. The carboxylic acids were shown to be greater than 98 percent pure by quantitative gas chromatography. Results of the experiments are tabulated below in Table 1.

In conducting the experiments described above the reaction temperature was allowed to proceed its normal course due to the exothermic reaction. When attempts were made to maintain the reaction temperature at room temperature or below by external cooling, in many cases the reaction could not be controlled and contained.

TABLE 1.—OXIDATION OF OLEFINIC HYDROCARBON WITH CATALYTIC SYSTEM OF PERACETIC ACID AND RUTHENIUM

| Run number | Ruthenium | | Olefinic hydrocarbon | | Solvent | | Temp. max., °C. | 40% peracetic acid, ml. | Heptanoic acid produced, wt. |
|---|---|---|---|---|---|---|---|---|---|
| | Compound | Wt. (g) | Type | Wt. (g.) | Type | Ml. | | | |
| 1 | None | | 1-octene | 35.00 | Heptane | 100 | 25 | 200 | 0.03 |
| 2 | RuO₂ | .050 | do | 35.00 | do | 100 | 82 | 200 | 15.70 |
| 3 | RuO₂ | .100 | do | 35.00 | do | 100 | 82 | 200 | 15.90 |
| 4 | RuCl₃ | .050 | do | 35.00 | do | 100 | 82 | 200 | 16.76 |
| 5 | None | | do | 35.00 | TFA ᵃ | 100 | 88 | 200 | 0.79 |
| 6 | RuCl₃ | .050 | do | 35.00 | TFA ᵃ | 100 | 84 | 200 | 5.15 |
| 7 | RuO₂ | .050 | do | 35.00 | | | 85 | 200 | 14.85 |
| 8 | RuO₂ | .050 | do | 35.00 | Pentane | 100 | 45 | 200 | 14.78 |
| 9 | RuO₂ | .053 | do | 11.22 | Hexane | 100 | 64 | 100 | 7.77 |
| 10 | RuO₂ | .050 | do | 35.00 | CH₂Cl₂ | 100 | 48 | 200 | 12.51 |
| 11 | RuO₂ | .053 | do | 11.22 | EtOAc ᵇ | 100 | 85 | 200 | 3.55 |
| 12 | RuO₂ | .050 | do | 35.00 | Heptane | 300 | 74 | 200 | 14.14 |
| 13 | RuO₂ | .050 | 7-tetradecene | 35.00 | do | 100 | 80 | 200 | 8.28 |

(ᵃ)TFA=Trifluoroacetic acid.  (ᵇ)EtOAc=Ethyl acetate.

Example II

A series of experiments were conducted using other Group VIII metals to determine the criticality of the presence of ruthenium in the catalytic system of the present invention. The experiments were conducted in the same manner as those described in Example I, and the results of such experiments are tabulated in the following Table 2.

TABLE 2

| Run number | Catalyst | | 1-octene wt. (g.) | Solvent | | Temp. max., °C. | 40% peracetic acid, ml. | Heptanoic acid, wt. |
|---|---|---|---|---|---|---|---|---|
| | Compound | Wt. (g.) | | Type | Ml. | | | |
| 14 | PdCl₂ | 0.050 | 35.00 | Heptane | 100 | 27 | 200 | 0.01 |
| 15 | PtO₂ | 0.050 | 35.00 | do | 100 | 33 | 200 | 0.08 |

The above data clearly indicate that essentially no carboxylic acids are formed when using palladium or platinum in place of ruthenium. Further, the only reaction which occured to any significance was a low conversion of the 1-octene to 1,2-epoxyoctane.

The above data also clearly indicate the novel catalytic system and the process for the catalytic oxidation of an olefinic hydrocarbon of the present invention. Further, the data clearly indicate that the desired results are obtained when ruthenium is employed as one of the catalyst constituents. At the same time, the data further illustrate that other members of the Group VIII metals will not function in the process for the catalytic oxidation of olefinic hydrocarbons employing the unique catalyst of the present invention. Thus, the above data clearly indicate not only the uniqueness of the present invention but also the criticality of the ruthenium-containing compound and peracid of the catalytic system of the present invention.

The carboxylic acids produced by the process of the present invention are useful as intermediates in the production of detergents, plasticizers, oil additives, insecticides, lubricating oils, as well as involumeric synthesis.

Various modifications and alterations of this invention will become apparent to those skilled in the art from the foregoing description and examples, and this invention should not be limited unduly to that set forth herein for illustrative purposes. Having thus described the invention,

I claim:

1. A process for the catalytic oxidation of an olefinic hydrocarbon to carboxylic acids in which cleavage of said olefinic hydrocarbons occurs at a point of unsaturation which comprises:
   (a) admixing from about 1 to 99.99999 weight percent of an olefinic hydrocarbon having from two to about 40 carbon atoms, with from about 0.00001 to 1 weight percent, based on the weight of said olefinic hydrocarbon, of ruthenium metal or a ruthenium-containing compound to produce a mixture having said ruthenium metal or ruthenium-containing compound dispersed therein;
   (b) adding from about 1 to $10^5$ weight percent of a peracid, based upon the weight of said olefinic hydrocarbon, to said mixture of a step (a) to form a resultant mixture wherein an exothermic reaction transpires, said resultant mixture being maintained for a period of time effective to allow substantial completion of said exothermic reaction; and
   (c) recovering from said resultant mixture carboxylic acid compounds formed during said exothermic reaction.

2. The process according to claim 1 wherein said ruthenium metal or ruthenium-containing compound is present in the range of about 0.0001 to about 0.001 weight percent and said peracid is present in the amount of about 50 to 1000 weight percent.

3. The process according to claim 1 wherein said olefinic hydrocarbon compound is present in the range of from about 10 to 80 weight percent, said ruthenium-containing compound is present in an amount of about 0.0001 to 1 weight percent and includes steps of admixing up to about 89 weight percent, based on the total weight of the reaction mixture, of an inert solvent medium selected from the group consisting of parafinic hydrocarbons having from about 5 to 30 carbon atoms, halogenated hydrocarbons having up to about 4 carbon atoms, and esters having from 2 to about 20 carbon atoms.

4. The process according to claim 3 which includes the step of cooling said resultant mixture of step (b) to ambient temperature prior to recovering said carboxylic acid components.

5. The process according to claim 3 wherein said solvent is a paraffin hydrocarbon containing from about 5 to 30 carbon atoms.

6. The process according to claim 5 wherein said ruthenium-containing compound is selected from the group consisting of ruthenium dioxide and ruthenium trichloride.

7. The process according to claim 6 wherein said ruthenium-containing compound is ruthenium trichloride.

8. The process according to claim 6 wherein said olefinic hydrocarbon compound is selected from the group consisting of α-olefins, internal olefins, branched olefins, cyclic olefins and mixtures thereof.

9. The process according to claim 8 wherein said olefinic hydrocarbon is an α-olefin compound or an internal olefin compound having from 2 to about 20 carbon atoms.

10. The process according to claim 8 wherein said peracid is selected from the group consisting of performic acid, trifluoroperacetic acid, peracetic acid, metachloroperbenzoic acid and perbenzoic acid.

11. The process according to claim 10 wherein said peracid is peracetic acid and said olefinic hydrocarbon compound is 1-octene or 7-tetradecene.

References Cited

UNITED STATES PATENTS 3,409,649  11/1968  Keblys et al. _____ 260—533 X

LORRAINE A. WEINBERGER, Primary Examiner

R. D. KELLY, Assistant Examiner

U.S. Cl. X.R.

260—413

PO-1050
(5/69)

UNITED STATES PATENT OFFICE
CERTIFICATE OF CORRECTION

Patent No. 3,658,896      Dated April 25, 1972

Inventor(s) Paul H. Washecheck

It is certified that error appears in the above-identified patent and that said Letters Patent are hereby corrected as shown below:

Page 2, column 3, line 71, please change "0.00001" to -- 0.0001 --.

Signed and sealed this 10th day of October 1972.

(SEAL)
Attest:

EDWARD M. FLETCHER, JR.      ROBERT GOTTSCHALK
Attesting Officer      Commissioner of Patents